May 22, 1962

J. F. LAYCAK 3,035,478

ELECTRONIC CALIPER

Filed May 4, 1960

INVENTOR
John F. Laycak
BY
ATTORNEY

May 22, 1962   J. F. LAYCAK   3,035,478
ELECTRONIC CALIPER

Filed May 4, 1960   3 Sheets-Sheet 3

INVENTOR
John F. Laycak
BY
ATTORNEY

United States Patent Office 3,035,478
Patented May 22, 1962

3,035,478
ELECTRONIC CALIPER
John Francis Laycak, Duquesne, Pa., assignor to Jones & Laughlin Steel Corporation, Pittsburgh, Pa., a corporation of Pennsylvania
Filed May 4, 1960, Ser. No. 26,859
10 Claims. (Cl. 88—14)

This invention relates to apparatus for electrically measuring and indicating the width or other dimension of an article, and more particularly to an electronic caliper which will visually indicate the actual width of an article, the desired width of that article, and the difference between the actual and desired widths.

As a primary object, the present invention seeks to provide a new and improved high-speed electronic calipering system for the measurement and display of surface dimensions of moving or stationary bodies. Although not limited thereto, the invention is particularly adapted for use with non-contacting dimensional measuring systems. As is well known, it is sometimes necessary to measure the width or other dimension of an article by such non-contacting techniques as, for example, where the object being measured is at a very high temperature. If the body being measured has a different light intensity than the background surrounding it, such as an irradiant steel slab or an externally-illuminated object, non-contacting dimensional measurements may be obtained by the use of an electron-optics device wherein the light intensity from the object being measured will produce an electrical image on a photosensitive surface. By scanning this surface with an electron beam, an electrical wave form may be produced whose duration is related to the dimension being measured. As will be seen, the invention described herein is particularly concerned with the means for converting the aforesaid wave form produced by the electron-optics device into a visual indication of the magnitude of the dimension being measured. In one specific application, the invention may be used in conjunction with the rolling and shearing of hot steel slabs, blooms and the like wherein off-weights, manifest in off-dimensions, may result in short sheared lengths with their attendant yield losses.

As another object, the invention seeks to provide an electronic calipering ssytem which will visually indicate the actual width of an article being measured, the desired width of that article, and the difference between the actual and desired widths.

In accordance with the invention, hereinafter described, an electron-optics device scans an image of an article which has a different optical appearance than the background surrounding it and generates a wave form whose duration is related to the actual width of the object being measured. This wave form causes a binary to perform relaxation oscillations at a set reference frequency for the duration of the input wave form. These pulses are then counted and displayed as the measured width of the object. Concurrent with, and synchronized with, the output of the electron-optics device, a wave form is generated whose time duration is manually adjusted whereby it is proportional to the desired width of the object being measured. This wave form causes another binary to perform relaxation oscillations at the said set reference frequency, these pulses being counted and displayed as the ordered width of the object. The measured and ordered width wave forms are also mixed to produce a third wave form whose duration is related to the difference between the measured and ordered width of the object. This third wave form is used to trigger a third binary which performs relaxation oscillations at the said set reference frequency for the duration of the third wave form. The output of the third binary is then counted and presented as the difference between the measured and ordered widths. Thus, the actual and desired widths are visually displayed, as well as the difference between those widths. Additionally, the difference is displayed as being either less or greater than the ordered width.

The above and other objects and features of the invention will become apparent from the following detailed description taken in connection with the accompanying drawings which form a part of this specification and in which.

Figure 1:
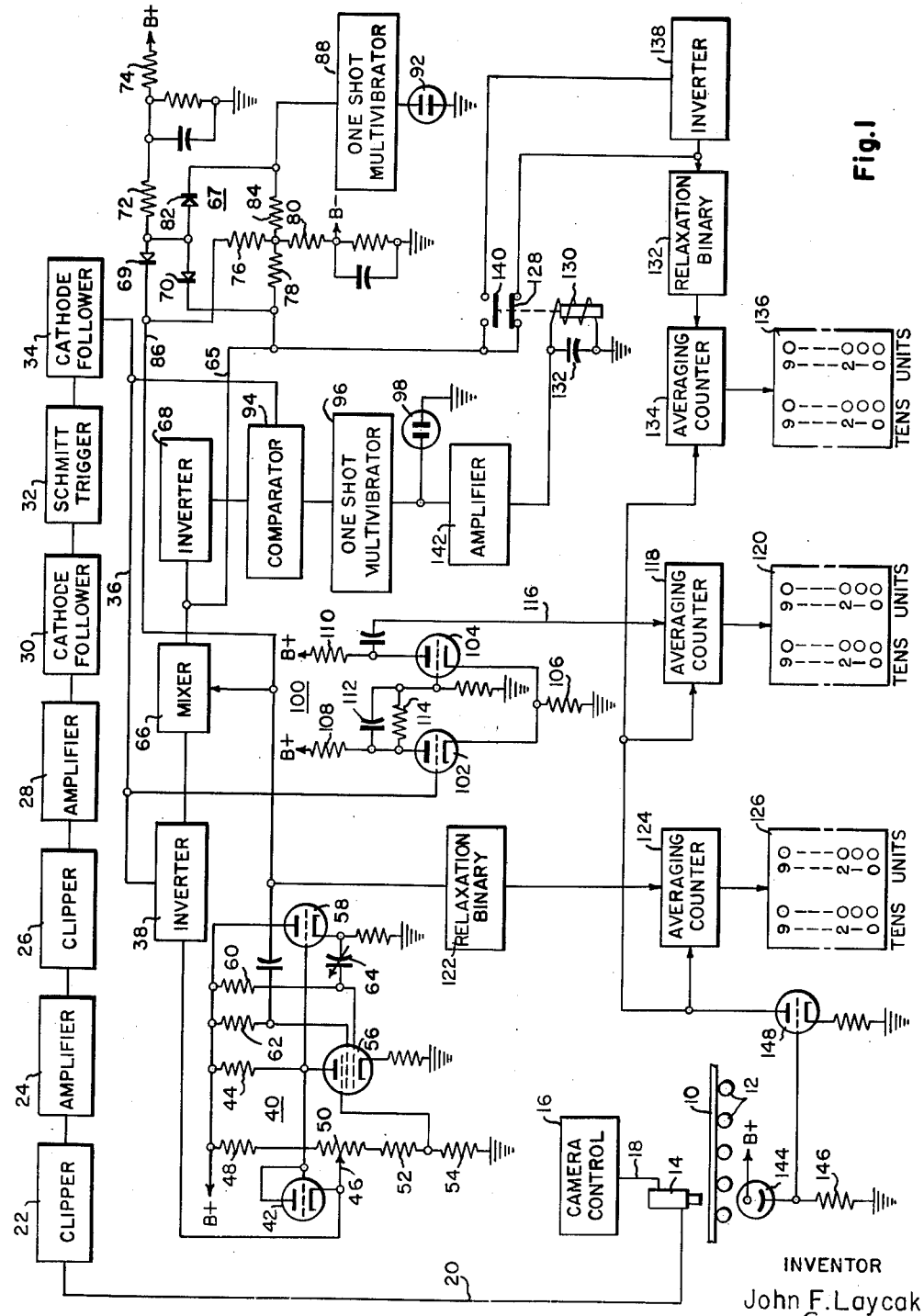
FIG. 1 is an overall schematic circuit diagram of one embodiment of the invention.

Referring to FIG. 1, the object being measured is illustrated as an irradiant hot steel slab 10 which, as will be understood, travels parallel to the plane of the drawing on conveyor rolls 12. Although an irradiant slab is shown herein for illustrative purposes, it should be understood that the object being measured may be a reflective body which is illuminated by external means, the important thing being that the object has a different light intensity than the background surrounding it, or at least a different optical appearance.

Figure 2A:
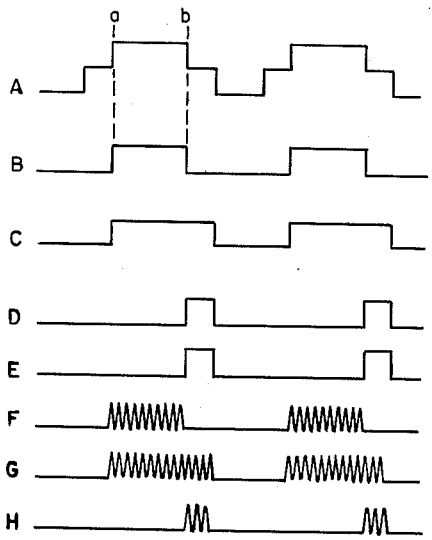
FIG. 2A is an illustration of wave forms appearing at various points in the circuit of FIG. 1 for the case where the actual width of the object being measured is less than the desired width.

Disposed above the object 10 is a vidicon tube, generally indicated at 14, which is adapted to scan over a single fixed line which extends substantially perpendicular to the direction of movement of slab 10. A camera sweep generator and control circuit 16 is provided to produce a sawtooth wave form which causes the electron beam of the vidicon to periodically sweep over an image of the surface of slab 10. The sawtooth wave form is fed to the vidicon 14 via lead 18, and the video output wave form from the vidicon, illustrated as wave form A in FIG. 2A, appears on lead 20. As shown in FIG. 2A, the video wave form is a series of relatively long pulses having voltage pedestals superimposed thereon. Thus, it will be apparent from FIG. 2A that as the electron beam sweeps from one side of the conveyor to the other, it will first scan the dark background portion of the conveyor until it reaches point *a* which is the edge of the irradiant slab 10. After intercepting the edge of the slab, the voltage of the video wave form increases because of the greater light intensity of the slab. At point *b* in the wave form the electron beam leaves the edge of the slab, and the voltage decreases due to the dark background of the conveyor. In this manner, a voltage pedestal is produced between points *a* and *b* for each sweep of the electron beam.

From lead 20 the wave form A is passed through a first clipper 22 and amplifier 24 to a second clipper 26 and a second amplifier 28. Circuit 24 amplifies the wave form, and clipper 26 further refines the clipping action so as to insure that clean pulses of high amplitude appear at the output of amplifier 28. These pulses, then, appear as wave form B in FIG. 2A wherein the voltage pedestals between points *a* and *b* are removed from the relatively long base pulses. The pulses in wave form B are then passed through cathode follower 30 to a Schmitt trigger multi-vibrator circuit 32 which further refines the pulses and feeds them to a cathode follower 34 which produces positive output pulses on lead 36 corresponding to the pulses in wave form B in FIG. 2A.

The pulses on lead 36, being of positive polarity, are passed through inverter 38 to a phantastron circuit, generally indicated at 40. In the phantastron, the negative pulses from inverter 38 are applied to the cathode of a normally non-conducting triode 42 which functions as a diode by virtue of the fact that its control grid and anode are interconnected. As shown, the control grid and anode of triode 42 are connected to a source of positive plate voltage, identified as B+, through resistor 44. The cathode of triode 42 is connected through movable tap 46 to a voltage divider comprising resistors 48, 50, 52 and 54 connected in series between the B+ voltage source and ground. Also included in the phantastron are a pentode 56 and a triode 58. It will be noted that the control and screen grids of pentode 56 are connected to the positive plate voltage supply B+ through resistors 60 and 62 respectively. Normally, electrons will flow from the cathode of the pentode to its control and screen grids rather than its anode, since these elements have a higher positive potential than the anode which is connected to the B+ voltage source through resistor 44. When, however, a negative pulse from inverter 38 is applied to the cathode of triode 42, the triode will conduct to thereby raise the voltage at the junction of resistors 52 and 54. The positive voltage pulse thus produced between resistors 52 and 54 is applied to the suppressor grid of the pentode 56. This causes the electrons on the cathode of the pentode to be accelerated toward the anode so that the voltage at the anode falls; and this fall in plate voltage is applied to the grid of triode 58 whereby the triode is cut off and its cathode voltage falls. The resulting fall in cathode voltage is applied through variable capacitor 64 to the control grid of pentode 56 until, over a predetermined time interval determined by the discharge rate of capacitor 64, the voltage on the control grid cuts off the pentode 56 to complete the cycle. The output voltage of the phantastron appearing at the screen grid of the pentode 56 is thus a positive pulse for each input pulse from inverter 38. The resulting output pulses from the phantastron appear as wave form C in FIG. 2A where the leading edge of each pulse coincides with the leading edge of a corresponding pulse in wave form B. The length of each pulse in wave form C, however, is determined by the capacitance of capacitor 64. As will be understood, the width of the pulses in wave form B are proportional to the actual width of the slab 10; whereas, the width of those pulses in wave form C may be varied by adjusting variable capacitor 64 whereby they will be proportional to the desired width of the slab 10.

The positive pulses at the output of phantastron 40 are compared in phase opposition with the negative pulses from inverter 38 in mixer 66. Thus, in mixer 66 the inverted pulses in wave form B will be compared with the positive pulses in wave form C to produce wave form D wherein pulses are produced having widths proportional to the difference in width between pulses in wave form C and those in wave form B. Since the positive pulses in wave form C are longer than the negative pulses in wave form B for the illustration given in FIG. 2A, and since the two wave forms are compared in phase opposition in mixer 66, the pulses in wave form D will be positive. These pulses are applied via lead 65 to a diode comparator circuit, generally indicated at 67, as well as an inverter 68.

The comparator 67 comprises a pair of diodes 69 and 70 having their anodes connected through resistors 72 and 74 to a B+ voltage source, and their cathodes connected through resistors 76 and 78, respectively, and common resistor 80 to a source of B— voltage. Also included in the circuit is a third diode 82 having its cathode connected to the B— source through resistors 84 and 80. The anode of diode 82 is connected, as shown, to the anodes of diodes 69 and 70 as well as the B+ voltage source through resistors 72 and 74. In operation, a portion of the current between the B+ and B— voltage sources will normally flow through diode 82; however, a large part of that current will be shunted through diodes 69 and 70. Consequently, the voltage level at the cathode of diode 82 will be relatively low. When a positive pulse at the output of phantastron 40 is applied via lead 86 to the cathode of diode 69, this diode will be cut off, and the voltage at the cathode of diode 82 will rise in the positive direction, but not enough to trigger the one-shot or monostable multivibrator 88. Similarly, a positive pulse in wave form D at the output of mixer 66 on lead 65 will bias diode 70 to cut off, but the voltage at the cathode of diode 82 will again not rise to the firing level of circuit 88. The voltage at the cathode of diode 82 will rise to the firing level of circuit 88 when, and only when, both diodes 69 and 70 are cut off, and this occurs only upon coincidence of a positive pulse in wave form C at the output of phantastron 40 with a positive pulse in wave form D at the output of mixer 66. Thus, the output of coincidence circuit 67 will appear as wave form E where a positive pulse of sufficient amplitude to trigger the one-shot multivibrator 88 is produced only upon coincidence of a pulse in wave form C with a pulse in wave form D. The output pulses from one-shot multivibrator 88 will then energize neon lamp 92 to indicate that the pulses in wave form C are longer than those in wave form B, meaning that the actual width of the slab 10 is less than the ordered or desired width as determined by the adjustment of capacitor 64 in phantastron 40. As will be understood, the pulses in wave form D occur many times each second and, consequently the neon tube 92 will glow continuously whenever the pulses in wave form C are longer than those in wave form B to indicate that the actual width of the slab 10 is less than the ordered or desired width.

Figure 2B:
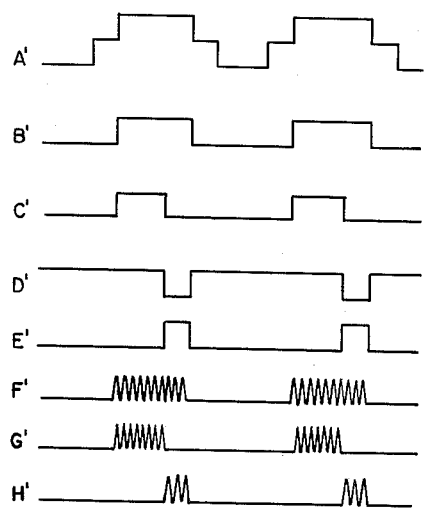
FIG. 2B is an illustration of wave forms appearing at various points in the circuit of FIG. 1 for the case where the actual measured width is greater than the desired width of the object.

Whenever the actual width of the slab 10 is greater than the ordered or desired width as determined by the adjustment of capacitor 64 in phantastron 40, the pulses at the output of cathode follower 34 will be longer than those at the output of phantastron 40. This condition is illustrated in FIG. 2B where the wave form B' will appear on lead 36 while wave form C' will appear at the output of the phantastron. When the inverted pulses in wave form B' are mixed in phase opposition with those in wave form C' in mixer 66, the resulting output wave form D' will have negative pulses therein. These pulses will also be applied via lead 65 to the cathode of diode 70, but since they are of negative polarity, they will not cut off the diode and no pulses will appear at the output of comparator 67, even though it should happen that a pulse in wave form C' should coincide with a pulse in wave form D'. The pulses at the output of mixer 66 are also passed to inverter 68 as was explained above. The output pulses of the inverter 68 are applied to a comparator 94 as well as the pulses on lead 36 at the output of cathode follower 34. Comparator 94 is identical in construction to comparator 67 already described and includes three diodes with the pulses on lead 36 being applied to the cathode of a diode corresponding to diode 69 in circuit 67, while the pulses from inverter 68 are applied to the cathode of another of the diodes corresponding to diode 70 in circuit 67. If positive pulses appear at the output of mixer 66, indicating that the actual width of the slab 10 is less than the ordered width, they will be inverted in inverter 68 so that they will not affect the operation of comparator 94. When, however, the actual width of slab 10 is greater than the ordered width, negative pulses will appear at the output of mixer 66 and these will be inverted in inverter 68 whereby they may be compared with the pulses on lead 36 to produce an output pulse upon coincidence of a pulse on lead 36 with a pulse from inverter 68. Thus, the output of inverter 68 will appear as wave form E' in FIG. 2B. As shown, the pulses at the output of comparator 94 are applied to the one-shot multivibrator 96, similar to multivibrator 88, which will energize a neon lamp 98 whenever the width of slab 10 is wider than the ordered width.

As shown, the pulses on lead 36 are also applied to a relaxation binary circuit, generally indicated at 100. The binary circuit 100 includes a pair of triode tubes 102 and 104 having their cathodes connected to ground through a common resistor 106. The plate of triode 102 is connected to a B+ voltage source through resistor 108; whereas the plate of triode 104 is connected to the same source of plate voltage through resistor 110. The signal on the plate of triode 102 is coupled to the grid of triode 104 through the parallel combination of capacitor 112 and resistor 114. With this arrangement, the circuit 110 will produce relaxation oscillations on the plate of triode 104 whenever a positive pulse is applied to the grid of triode 102 via lead 36. Consequently, the output of the relaxation binary 100 will appear as wave form F in FIG. 2A where groups of oscillations occur for the duration of successive pulses in wave form B. These groups of oscillations are applied via lead 116 to an averaging counter 118 which will average the number of oscillations occurring in a predetermined number of groups of oscillations in wave form F. The averaging counter 118 may, for example, be of the type shown and described in my copending application Serial No. 862,676, filed December 29, 1959, and assigned to the assignee of the present application. The output of the averaging counter 118, which will be a group of oscillations in which the number of oscillations is the average of those appearing in a predetermined number of oscillations from binary 100, is fed to a display circuit 120 which will indicate the actual width of slab 10 in inches and tenths of inches, for example.

In a similar manner, the pulses at the output of phantastron 40 are fed to a relaxation binary 122 which will produce groups of oscillations which are, in turn, fed to an averaging counter 124, identical in construction to the averaging counter 118 already described. The output of averaging counter 124 is then fed to display unit 126 which will indicate the desired width of the slab 10 in inches and tenths of inches as does the display unit 120.

It will be noted that the widths of the pulses in wave form D or wave form D', as the case may be, are proportional to the difference between the actual and desired widths of the slab 10. If the desired width of the slab 10 is greater than the actual width as in the case of FIG. 2A, the pulses in wave form D will be of positive polarity. These pulses may be applied through the normally closed contacts 128 of relay 130 to a relaxation binary 132 which is similar in construction to the binaries 100 and 122 already described. The output of relaxation binary 132 is then fed to averaging counter 134 which will produce wave form H in which a group of oscillations is produced each time a pulse appears in wave form D. The groups of oscillations in wave form H are then averaged in counter 134, and the resulting average number of oscillations are fed to the display unit 136 which will indicate the difference between the actual and desired widths of slab 10.

If, on the other hand, the actual width of the slab 10 is greater than the desired width as in the case of FIG. 2B, the pulses in wave form D' appearing at the output of mixer 66 will be of negative polarity. Since it is necessary to trigger the relaxation binary 132 with positive pulses, an inverter 138 is provided in a circuit which may be selectively connected to the output of mixer 66 through the normally open contacts 140 of relay 130. It will be remembered that when negative pulses appear at the output of mixer 66, the one-shot multivibrator 96 is actuated to produce output pulses which are amplified in amplifier 142 and used to actuate the relay 130 which has a large RC time constant capacitor 132 connected in shunt therewith. Thus, as long as pulses appear at the output of the one-shot multivibrator 96 in response to a condition wherein the slab 10 is wider than the desired width of the slab, the relay 130 will remain energized whereby the pulses in wave form D' will be inverted and then applied to relaxation binary 132. Under these conditions, the difference between the actual and desired widths will still be displayed in display circuit 136 while the neon lamp 98 is energized. This indicates that the slab is wider than the desired width. If, however, the neon lamp 92 is energized, the significance is that the slab is narrower than the desired width. In either case, however, the difference between the actual and desired widths is indicated by circuit 136.

Directly beneath the vidicon 14 is a photocell 144 having its anode connected to a source of B+ voltage and its cathode connected to ground through resistor 146. The cathode of photocell 144 is also connected to the grid of a normally non-conducting triode 148. As the leading edge of the irradiant or illuminated slab 10 initially passes beneath the vidicon 14, the voltage on the cathode of the photocell 144 will rise and the triode 148 will conduct to reset each of the averaging counters 118, 124 and 134. In this manner, the readings registered on the display circuits for the previous slab will be removed; and the counters will begin counting from zero when the leading edge of the slab 10 passes beneath the vidicon 14.

Figure 3:
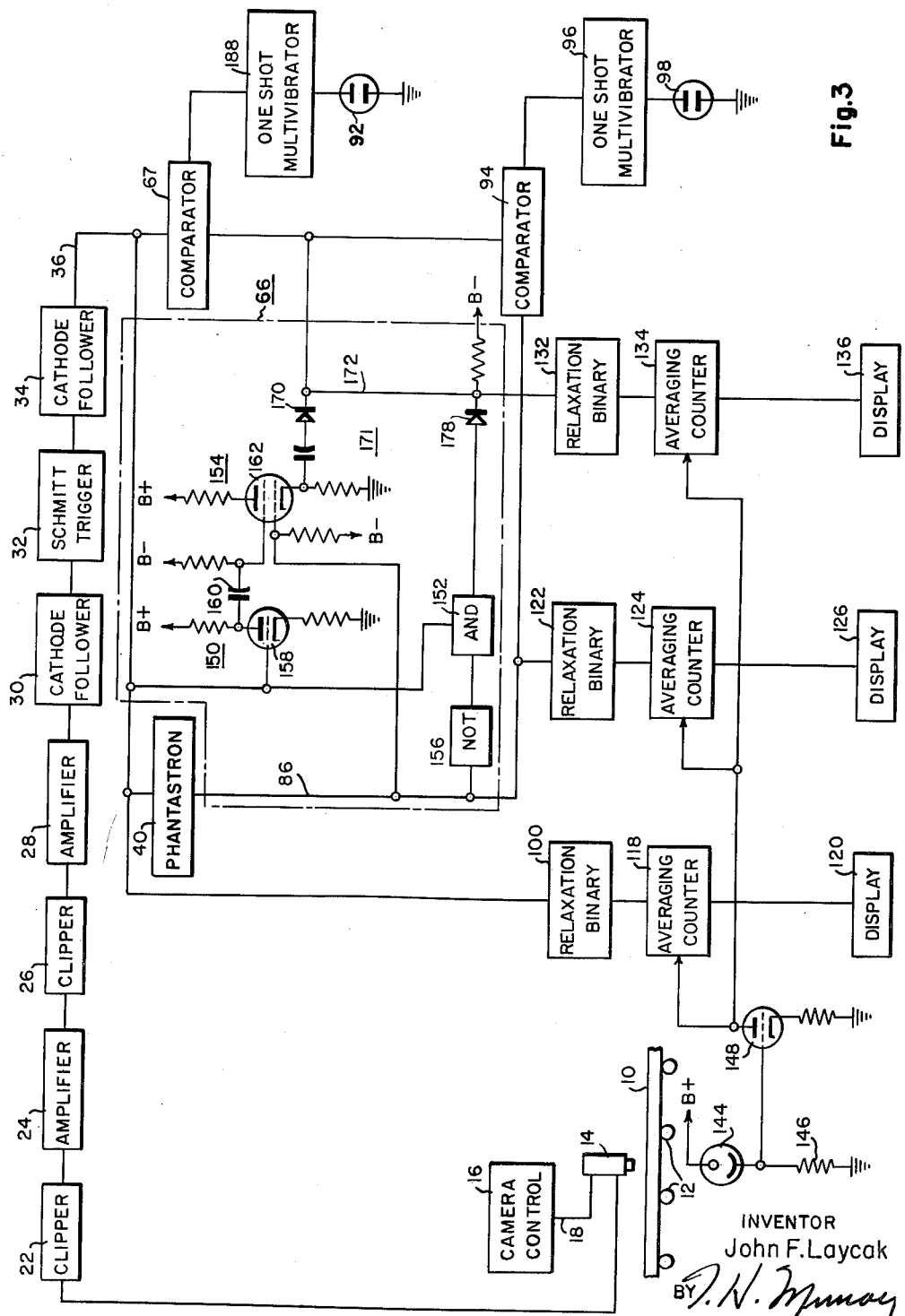
FIG. 3 is a schematic circuit diagram of another embodiment of the invention.

In FIG. 3 another embodiment of the invention is shown wherein the pulses in wave form D at the output of mixer 66 are always of the same polarity, regardless of whether or not the actual width of slab 10 is greater or less than the desired width as determined by phantastron 40. With this arrangement, the various inverters shown in the embodiment of FIG. 1 may be eliminated. The mixer 66 in the embodiment of FIG. 3 is enclosed by broken lines; and since this is the only circuit which differs from those shown in FIG. 1, it will be the only apparatus described in detail wtih reference to FIG. 3. The other circuits in FIG. 3 which correspond to identical circuits shown in FIG. 1 are identified by like reference numerals and are not hereinafter described in detail.

Figure 4:
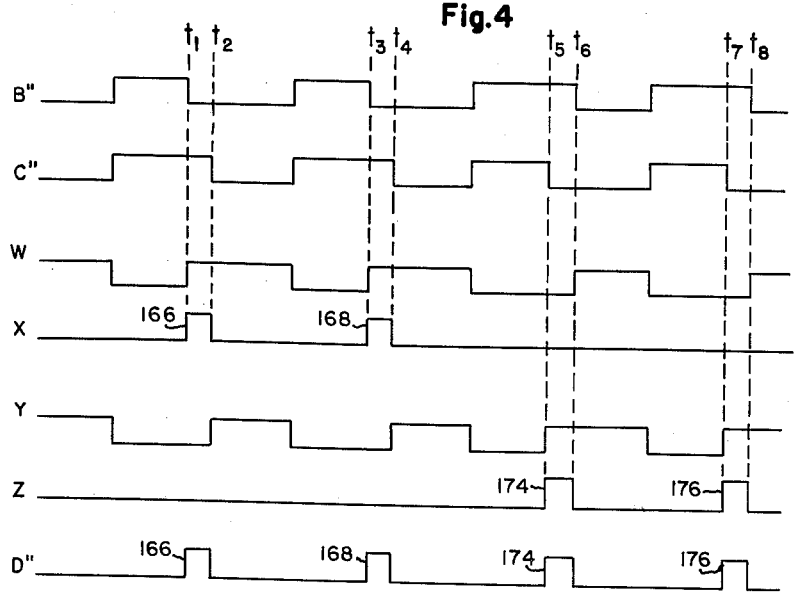
FIG. 4 is an illustration of wave forms appearing at various points in the circuit of FIG. 3.

As was the case with the embodiment of FIG. 1, the output of cathode follower 34 will be a series of voltage pulses each having a width proportional to the actual width of slab 10; whereas, the output pulses of the phantastron 40 will have widths proportional to the desired width of the slab 10. In FIG. 4 the first two cycles of operation are illustrated for the case where the actual width of slab 10 is less than the desired width; whereas, the last two cycles of operation are illustrated for the case where the actual width of the slab is greater than the desired width. Thus, the first two pulses in wave form B'' in FIG. 4 are shorter than the first two pulses in wave form C'' in FIG. 4. The last two pulses in wave form B'', however, are wider than the last two in wave form C''. Wave form B'' on lead 36 is applied to a "not" circuit 150 and an "and" circuit 152; whereas, the output of phantastron 40 is applied to an "and" circuit 154 and a "not" circuit 156. Only the circuits 150 and 154 are shown in detail in FIG. 3, it being understood that the construction and operation of circuits 156 and 152, respectively, are identical.

As shown, the "not" circuit 150 is essentially an inverter comprising a triode 158 having its control grid connected to lead 36 and its anode connected through capacitor 160 to one of the two grids of a tetrode 162 in the "and" circuit 154. The positive pulses in wave form C'' on lead 86 at the output of phantastron 40 are then applied via lead 164 to the other grid of the tetrode 162. The operational characteristics of tetrode 162 are such that it will conduct to produce a positive pulse on its cathode only upon coincidence of positive pulses on its two grids. After passing through "not" circuit 150, the wave form B'' in FIG. 4 will be inverted and will appear as wave form W. This wave form is then compared with wave form C'' in the "and" circuit 154. It will be noted that there is positive coincidence between pulses in wave form C'' and wave form W between times $t_1$ and $t_2$ in FIG. 4 and between times $t_3$ and $t_4$. Consequently, two pulses 166 and 168 are produced in wave form X at the cathode of tetrode 162. These positive pulses, then, will pass through diode 170 in "or" circuit 171 and appear on lead 172.

In a similar manner, the wave form C" in FIG. 4 is inverted in "not" circuit 156 to produce wave form Y. This wave form is then compared with wave form B" in "and" circuit 152 to produce an output pulse upon positive coincidence of a pulse in wave form B" with a pulse in wave form Y. From a consideration of FIG. 4, it will be seen that positive coincidence occurs between pulses in these two wave forms between times $t_5$ and $t_6$ and between times $t_7$ and $t_8$. Consequently, the wave form at the output of "and" circuit 152 will appear as wave form Z in FIG. 4 wherein positive pulses 174 and 176 are produced. Positive pulses 174 and 176 will pass through diode 178 to lead 172 where they combine with the pulses passing through diode 170 to produce wave form D" in FIG. 4. This wave form corresponds to wave forms D and D' in FIGS. 2A and 2B, respectively, and is employed to trigger the comparators 67 and 94 as well as the relaxation binary 122. Since, in this case, all of the pulses in wave form D" are positive regardless of whether the slab 10 is wider or narrower than the desired width, the necessity for the various inverters in the circuit of FIG. 1 is eliminated. Pulses 166 and 168 will coincide with pulses in wave form C" at the output of phantastron 40 to trigger one-shot multivibrator 96; whereas, pulses 174 and 176 will coincide with pulses in wave form B" on lead 36 to trigger the one-shot multivibrator 88. In addition, each of the pulses 166, 168, 174 and 176 will be fed to the relaxation binary 132 which will produce groups of oscillations in which the number of oscillations is proportional to the difference between the actual and desired widths. If the slab 10 is wider than the desired width, as when pulses 174 and 176 are produced, the neon lamp 92 will be energized to indicate this condition. Similarly, if the slab 10 is narrower than the desired width, as when pulses 166 and 168 are produced, the neon lamp 98 will be energized to indicate this condition. It will be noted that the operation of the neon lamps in FIG. 3 is reversed with respect to those of FIG. 1. This, however, makes little difference since the lamps may be identified on a control panel for the proper condition.

The invention thus provides a means for visually indicating the actual width of an article being measured, the desired width of that article and the difference between the actual and desired widths, as well as whether the difference is either less or greater than the desired width. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In apparatus for displaying the actual dimension of an article being measured, the desired dimension of that article, and the difference between the actual and desired dimensions, the combination of means for producing a first group of oscillations in which the number of oscillations is proportional to the actual dimension of said article, means for producing a second group of oscillations in which the number of oscillations is proportional to the desired dimension of said article, means for producing a third group of oscillations in which the number of oscillations is proportional to the difference between said actual and desired dimensions, first, second and third counting devices for counting the oscillations in said first, second and third groups of oscillations, and means for producing a visual indication of the number of oscillations counted by the respective counting devices.

2. In apparatus for displaying the actual dimension of an article being measured, the desired dimension of that article, and the difference between the actual and desired dimensions, the combination of means including an electron-optics device for producing a first voltage pulse having a width proportional to the actual dimension of an article being measured, means for producing a second voltage pulse having a width proportional to the desired value of that dimension, means for comparing said first and second pulses to produce a third pulse having a width equal to the difference in width between said first and second pulses, and means for producing a visual indication of the width of said first, second and third pulses.

3. In apparatus for displaying the actual dimension of an article being measured, the desired dimension of that article, and the difference between the actual and desired dimensions, the combination of means for producing first voltage pulses each having a width proportional to the actual dimension of an article being measured, means responsive to said first voltage pulses for producing second voltage pulses each having a width proportional to the desired value of that dimension, means for comparing said first and second pulses to produce third pulses each having a width equal to the difference in width between associated ones of said first and second pulses, means for producing first groups of oscillations in which the number of oscillations in each group is proportional to the width of an associated one of said first pulses, means for producing second groups of oscillations in which the number of oscillations in each group is proportional to the width of an associated one of said second pulses, means for producing third groups of oscillations in which the number of oscillations in each group is proportional to the width of an associated one of said third pulses, first, second and third counting devices for counting the average number of oscillations in said first, second and third groups of oscillations, and means for producing a visual indication of the average number of oscillations counted by the respective counting devices.

4. In an electrical gage for measuring the width of an article having a different optical appearance than the background surrounding it, an electron-optics device for scanning an image of said object with an electron beam to produce a first voltage pulse having a width proportional to the width of said object, a phantastron responsive to said first voltage pulse for producing a second pulse, said phantastron being adjustable whereby the width of said second pulse may be made proportional to the desired width of said object, means for comparing said first and second pulses to produce a third pulse having a width equal to the difference in width between said first and second pulses, and means for producing a visual indication of the widths of said first, second and third pulses.

5. In an electrical gage for measuring the width of an article having a different optical appearance than the background surrounding it, an electron-optics device for scanning an image of said object with an electron beam to produce voltage pulses each having a width proportional to the width of said object along the scanning line, a phantastron responsive to said first voltage pulses for producing second voltage pulses, said phantastron being adjustable whereby the width of said second pulses may be made proportional to the desired width of said object, means for comparing said first and second pulses to produce third pulses each having a width equal to the difference in width between associated ones of said first and second pulses, means for producing first groups of oscillations in which the number of oscillations in each group is proportional to the width of an associated one of said first pulses, means for producing second groups of oscillations in which the number of oscillations in each group is proportional to the width of an associated one of said second pulses, means for producing third groups of oscillations in which the number of oscillations in each group is proportional to the width of an associated one of said third pulses, first, second and third counting devices for counting the average number of oscillations in said first, second and third groups of oscillations, and means for producing a visual indication of the average number of oscillations counted by the respective counting devices.

6. In apparatus for displaying the actual dimension of an article being measured, the desired dimension of that article and the difference between the actual and desired dimensions, the combination of means including an electron-optics device for producing a first voltage pulse having a width proportional to the actual dimension of the article being measured, means responsive to said first voltage pulse for producing a second voltage pulse having a width proportional to the desired dimension of said article, means for comparing said first and second pulses to produce a third pulse having a width proportional to the difference between said actual and desired dimensions, means for producing a visual indication when the width of said first pulse is greater than the width of the second pulse, means for producing a visual indication when the width of the second pulse is greater than the width of the first pulse, and means for producing a visual indication of the widths of said first, second and third pulses.

7. In apparatus for displaying the actual dimension of an article being measured, the desired dimension of that article, and the difference between the actual and desired dimensions, the combination of means for producing a first train of voltage pulses in which each pulse has a width proportional to the actual dimension of the article being measured, means responsive to said first train of voltage pulses for producing a second train of voltage pulses in which each pulse has a width proportional to the desired dimension of said article, means for comparing said first and second trains of voltage pulses to produce a third train of voltage pulses in which each pulse has a width proportional to the difference in widths of associated ones of said pulses in the first and second trains, means for comparing said first train of voltage pulses with the third train of voltage pulses to produce a fourth train of voltage pulses whenever the pulses in said first train are wider than those in the second train, means for comparing said second train of voltage pulses with the third train of voltage pulses to produce a fifth train of voltage pulses whenever the pulses in said second train are wider than those in said first train, a device for visually indicating the existence of said fifth train, and means for visually indicating the average width of pulses in said first, second and third trains.

8. In apparatus for displaying the actual dimension of an article being measured, the desired dimension of that article, and the difference between the actual and desired dimensions, the combination of means for producing a first train of voltage pulses in which each pulse has a width proportional to the actual dimension of the article being measured, means responsive to said first train of voltage pulses for producing a second train of voltage pulses in which each pulse has a width proportional to the desired dimension of said article, means for comparing said first and second trains of voltage pulses to produce a third train of voltage pulses in which each pulse has a width proportional to the difference in widths of associated ones of said pulses in the first and second trains, means for producing a visual indication whenever the pulses in said first train are wider than those in the second train, means for producing a visual indication whenever the pulses in said second train are wider than those in the first train, means for producing first groups of oscillations in which the number of oscillations in each group is proportional to the width of an associated pulse in said first train of pulses, means for producing second groups of oscillations in which the number of oscillations in each group is proportional to the width of an associated one of said pulses in the second train of pulses, means for producing third groups of oscillations in which the number of oscillations in each group is proportional to the width of an associated one of the pulses in said third train of pulses, first, second and third counting devices for counting the average number of oscillations in said first, second and third groups of oscillations, and means for producing a visual indication of the average number of oscillations counted by the respective counting devices.

9. In an electrical gage for measuring the width of an article having a different optical appearance than the background surrounding it, an electron-optics device for scanning an image of said object with an electron beam to produce a first train of voltage pulses in which each pulse has a width proportional to the width of said object along the scanning line of said electron beam, a phantastron responsive to said first voltage pulses for producing a second train of voltage pulses, said phantastron being adjustable whereby the width of the pulses in said second train may be made proportional to the desired width of said object, means for comparing said first and second trains of pulses to produce a third train of pulses in which each pulse has a width equal to the difference in width between associated ones of the pulses in said first and second trains of pulses, means for comparing the pulses in said first train with those in the third train to produce a first visual indication whenever the pulses in said first train are wider than those in the second train, means for comparing the pulses in said second train with those in the third train to produce a second visual indication whenever the pulses in said second train are wider than those in the first train, and means for producing a visual indication of the average width of the pulses in said first, second and third trains of pulses.

10. In an electrical gage for measuring the width of an article having a different optical appearance than the background surrounding it, an electron-optics device for scanning an image of said object with an electron beam to produce a first voltage pulse having a width proportional to the width of said object, a phantastron responsive to said first voltage pulse for producing a second voltage pulse, said phantastron being adjustable whereby the width of said second pulse may be made proportional to the desired width of said object, means for comparing said first and second pulses to produce a third pulse having a width equal to the difference in width between said first and second pulses, means for comparing said third pulse with the first pulse to produce a visual indication whenever said first pulse is wider than the second pulse, and means for comparing said third pulse with the second pulse to produce a visual indication whenever the second pulse is wider than said first pulse.

References Cited in the file of this patent

UNITED STATES PATENTS

| | | |
|---|---|---|
| 2,674,915 | Anderson | Apr. 13, 1954 |
| 2,850,645 | Chilton et al. | Sept. 2, 1958 |
| 2,934,824 | Braybrook et al. | May 3, 1960 |